US010520935B2

(12) United States Patent
Tateno (10) Patent No.: US 10,520,935 B2
(45) Date of Patent: Dec. 31, 2019

(54) DISTRIBUTED CONTROL SYSTEM, CONTROL DEVICE, CONTROL METHOD, AND COMPUTER PROGRAM PRODUCT

(71) Applicant: Kabushiki Kaisha Toshiba, Minato-ku, Tokyo (JP)

(72) Inventor: Genki Tateno, Hino Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 229 days.

(21) Appl. No.: 15/525,018

(22) PCT Filed: Nov. 6, 2015

(86) PCT No.: PCT/JP2015/081381
§ 371 (c)(1),
(2) Date: May 5, 2017

(87) PCT Pub. No.: WO2016/076236
PCT Pub. Date: May 19, 2016

(65) Prior Publication Data
US 2017/0315544 A1    Nov. 2, 2017

(30) Foreign Application Priority Data

Nov. 12, 2014   (JP) ................................ 2014-230081

(51) Int. Cl.
*G05B 23/02* (2006.01)
*G05B 19/05* (2006.01)

(52) U.S. Cl.
CPC ......... *G05B 23/0243* (2013.01); *G05B 19/05* (2013.01); *G05B 2219/13186* (2013.01)

(58) Field of Classification Search
CPC .......... G05B 19/05; G05B 2219/13186; G05B 23/0243
See application file for complete search history.

(56) References Cited

U.S. PATENT DOCUMENTS 10,198,536 B2 *   2/2019   Rathgeb ................. G05B 17/02
2002/0120708 A1 *  8/2002   Mizukami ............. H04L 41/046
                                                    709/213

(Continued)

FOREIGN PATENT DOCUMENTS

JP    H09-091011 A    4/1997
JP    H10-333721 A    12/1998

(Continued)

OTHER PUBLICATIONS

International Search Report and Written Opinion mailed by Japan Patent Office dated Jan. 26, 2016 in the corresponding PCT patent application No. PCT/JP2015/081381.

*Primary Examiner* — Mohamed A. Wasel
(74) *Attorney, Agent, or Firm* — Knobbe, Martens, Olson & Bear, LLP (57) ABSTRACT

According to one embodiment, a distributed control system comprises a communication network and a plurality of control devices configured to control devices to be controlled, respectively. The control devices each include a simulator to which a program organization unit is allocated in advance, configured to simulate the allocated program organization unit, and a shared memory that stores a simulation result of the program organization unit simulated by the simulator to be shared with another control device. At least one of the control devices includes a simulation table database that can store therein an execution time of each of the program organization units allocated in advance to the control devices, and a simulation commander that stores, in the simulation table database, the execution time of each of the program organization units corresponding to the simulation result.

8 Claims, 8 Drawing Sheets

| | PLC 24-1 ALLOCATION INFORMATION (72-1) | PLC 24-1 EXECUTION RESULT (ms) (73-1) | PLC 24-2 ALLOCATION INFORMATION (72-2) | PLC 24-2 EXECUTION RESULT (ms) (73-2) | ... | PLC 24-y ALLOCATION INFORMATION (72-y) | PLC 24-y EXECUTION RESULT (ms) (73-y) |
|---|---|---|---|---|---|---|---|
| SIMULATION MODE | ON | | ON | | ... | ON | |
| MS TASK | POU1 | 200 | POU3 | 100 | ... | POU37 | 1150 |
| | POU2 | 350 | (N/A) | (N/A) | ... | (N/A) | (N/A) |
| | ...... | ...... | ...... | ...... | ... | ...... | ...... |
| HS TASK | POU4 | 70 | POU8 | 125 | ... | POU42 | 85 |
| | POU7 | 50 | (N/A) | (N/A) | ... | (N/A) | (N/A) |
| | ...... | ...... | ...... | ...... | ... | ...... | ...... |

70, 71

(56) References Cited

U.S. PATENT DOCUMENTS

| | | | |
|---|---|---|---|
| 2003/0093257 A1* | 5/2003 | Cavanagh | G06F 17/5022 703/14 |
| 2005/0085928 A1* | 4/2005 | Shani | G05B 19/056 700/18 |
| 2009/0006066 A1* | 1/2009 | Behm | G06F 11/261 703/15 |
| 2013/0066616 A1* | 3/2013 | Shimakawa | G05B 19/4068 703/7 |
| 2013/0218307 A1* | 8/2013 | Hoernicke | G05B 17/02 700/81 |
| 2014/0180644 A1* | 6/2014 | Maturana | G05B 17/02 703/1 |
| 2015/0248232 A1* | 9/2015 | Brown | G06F 3/0486 715/863 |
| 2017/0277175 A1* | 9/2017 | Yoshida | G05B 23/0243 |

FOREIGN PATENT DOCUMENTS

| | | |
|---|---|---|
| JP | H11-085220 A | 3/1999 |
| JP | 2005-044038 A | 2/2005 |
| JP | 2007-241556 A | 9/2007 |
| JP | 2009-015401 A | 1/2009 |
| JP | 2012-059078 A | 3/2012 |
| JP | 2015-210728 A | 11/2015 |

* cited by examiner

| SIMULATION MODE | PLC 24-1 ALLOCATION INFORMATION (72-1) | PLC 24-1 EXECUTION RESULT (ms) (73-1) | PLC 24-2 ALLOCATION INFORMATION (72-2) | PLC 24-2 EXECUTION RESULT (ms) (73-2) | ... | PLC 24-y ALLOCATION INFORMATION (72-y) | PLC 24-y EXECUTION RESULT (ms) (73-y) |
|---|---|---|---|---|---|---|---|
| | ON | | ON | | | ON | |
| MS TASK | POU1 | 200 | POU3 | 100 | ... | POU37 | 1150 |
| | POU2 | 350 | (N/A) | (N/A) | ... | (N/A) | (N/A) |
| | ... | ... | ... | ... | ... | ... | ... |
| HS TASK | POU4 | 70 | POU8 | 125 | ... | POU42 | 85 |
| | POU7 | 50 | (N/A) | (N/A) | ... | (N/A) | (N/A) |
| | ... | ... | ... | ... | ... | ... | ... |

FIG.7

| | PLC 24-1 ALLOCATION INFORMATION (72-1) | PLC 24-1 EXECUTION RESULT (ms) (73-1) | PLC 24-2 ALLOCATION INFORMATION (72-2) | PLC 24-2 EXECUTION RESULT (ms) (73-2) | ... | PLC 24-y ALLOCATION INFORMATION (72-y) | PLC 24-y EXECUTION RESULT (ms) (73-y) |
|---|---|---|---|---|---|---|---|
| SIMULATION MODE (71) | OFF | | OFF | | | OFF | |
| MS TASK | POU1 | 200 | POU3 | 100 | ... | POU37 | 1150 |
| | POU2 | 350 | (N/A) | (N/A) | ... | (N/A) | (N/A) |
| | ... | ... | ... | ... | ... | ... | ... |
| HS TASK | POU4 | 70 | POU8 | 125 | ... | POU42 | 85 |
| | POU7 | 50 | (N/A) | (N/A) | ... | (N/A) | (N/A) |
| | ... | ... | ... | ... | ... | ... | ... |
| ... | ... | ... | ... | ... | ... | ... | ... |
| ALTERNATIVE PLC (ALTERNATIVE NODE) (74) | PLC24-2 | - | PLC24-1 | - | ... | PLC24-9 | - |

| INPUT/OUTPUT DATE AND TIME DATA | POU SPECIFYING DATA | INPUT DATA | SERVER OUTPUT DATA | LOCAL OUTPUT DATA | OUTPUT DETERMINATION DATA |
|---|---|---|---|---|---|
| 2014/06/23 16:14:10:000 | POU1 | 0 | 1 | 0 | NO MATCH |
| 2014/06/23 16:14:10:500 | POU1 | 1 | 0 | 0 | MATCH |
| 2014/06/23 16:14:11:000 | POU1 | 0 | 1 | 1 | MATCH |
| ...... | ...... | ...... | ...... | ...... | ...... |

81 · 82 · 83 · 84 · 85 · 86

DISTRIBUTED CONTROL SYSTEM, CONTROL DEVICE, CONTROL METHOD, AND COMPUTER PROGRAM PRODUCT

CROSS-REFERENCE TO RELATED APPLICATIONS

This application is national stage application of International Application No. PCT/JP2015/081381, filed Nov. 6, 2015, which designates the United States, incorporated herein by reference, and which claims the benefit of priority from Japanese Patent Application No. 2014-230081, filed Nov. 12, 2014, the entire contents of which are incorporated herein by reference.

FIELD

An embodiment described herein relates generally to a distributed control system, a control device, a control method, and a computer program product.

BACKGROUND

Control systems for use in plants have been known, in which controllers are connected to respective distributed communication modules to operate the entire control system in coordination with one another via a communication network.

Such a control system is required for exerting real-time performance which enables transmission of communication frames containing a control command and control data via the communication network within a pre-defined period of time.

Meanwhile, so-called cloud computing has been known as one form of the utilization of the computer, in which a server is controlled to carry out actual operations and save data via communication network such as the Internet, providing a user the operations and data for use as a service.

In order to distribute loads to local systems in the control system for a plant, however, introduction of the cloud computing may makes it difficult for the control system to maintain real-time performance.

Meanwhile, conventional local control systems widely adopt sequence control, most of which is implemented as software to operate on a programmable logic controller (PLC).

The PLC as a control device is configured as a compact-size computer and, as with other computers, carries out operations by software on a microprocessor and uses as a behavioral model a state machine which is built upon a relay circuit.

For developing a large-scale control system, control devices (PLCs) need to work in coordination with one another, however, operation allocation to the PLCs is entrusted to designers of the control system. Thus, the operation allocation may not be always optimal.

DETAILED DESCRIPTION

In general, according to one embodiment, a distributed control system comprises a communication network, and a plurality of control devices connected to each other via the communication network, configured to control devices to be controlled, respectively. The control devices each include a simulator to which a program organization unit is allocated in advance, configured to simulate the allocated program organization unit, the program organization unit constituting part of a control program executed in the distributed control system, and a shared memory that stores a simulation result of the program organization unit simulated by the simulator to be shared with another control device. At least one of the control devices includes a simulation table database that can store therein an execution time of each of the program organization units allocated in advance to the control devices, and a simulation commander that stores, in the simulation table database, the execution time of each of the program organization units corresponding to the simulation result, referring to the shared memory.

Hereinafter, embodiments will be described in detail with reference to the accompanying drawings.

[1] First Embodiment

Figure 1:
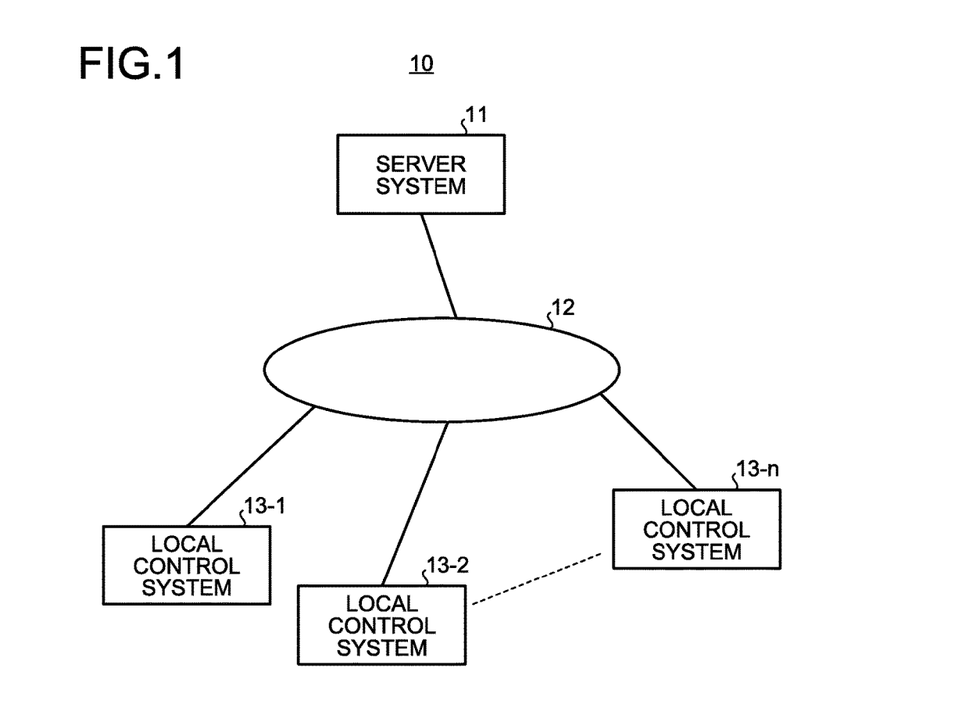
FIG. 1 is a schematic configuration block diagram of a distributed control system according to an embodiment.

FIG. 1 is a schematic configuration block diagram of a distributed control system according to an embodiment.

A distributed control system 10 generally includes a server system 11 and multiple local control systems 13-1 to 13-*n* (where n is an integer equal to or larger than two) connected to the server system 11 via a communication network 12.

Configurations of the local control systems 13-1 to 13-*n* will be now described.

The local control systems 13-1 to 13-*n* have similar configurations. In the following the local control system 13-1 will be described as an example.

Figure 2:
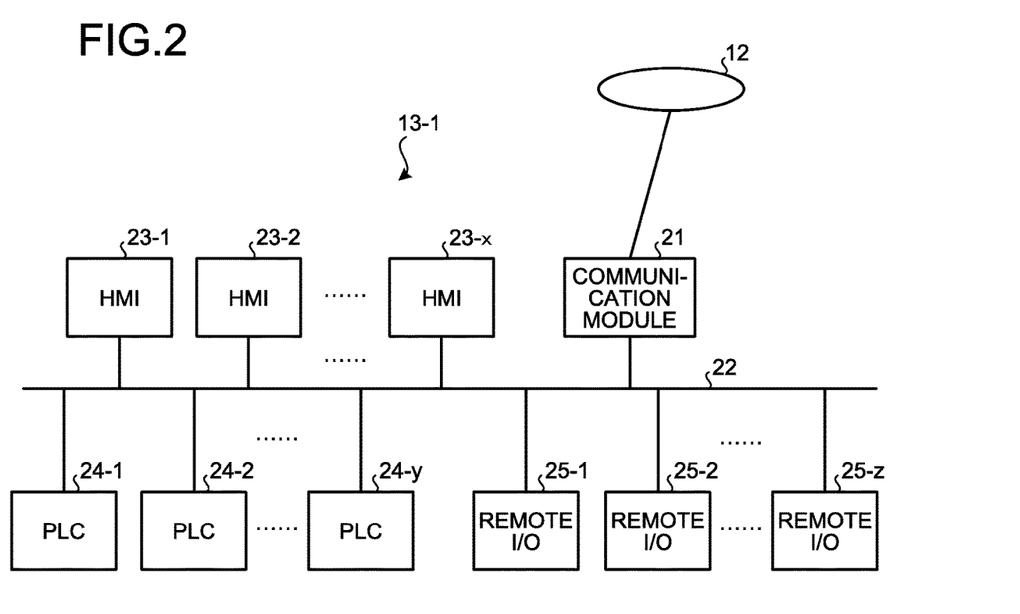
FIG. 2 is a schematic configuration block diagram of a local control system.

FIG. 2 is a schematic configuration block diagram of the local control system.

The local control system 13-1 includes a communication module 21, multiple human machine interfaces (HMIs) 23-1 to 23-*x* (where x is an integer equal to or larger than two), multiple PLCs 24-1 to 24-*y* (where y is an integer equal to or larger than two), and multiple remote I/Os 25-1 to 25-*z* (where z is an integer equal to or larger than two). The communication module 21 works as an interface to the communication network. The human machine interfaces (HMIs) 23-1 to 23-*x* are connected to the communication module 21 via a LAN 22 for allowing an operator to carry out various types of operation. The PLCs 24-1 to 24-*y* control respective output devices (controlled devices) connected to the PLCs 24-1 to 24-*y*. The remote I/Os 25-1 to 25-*z* work as interfaces to the respective output devices connected to the remote I/Os 25-1 to 25-*z*.

Next, a configuration of the PLCs will be described.

The PLCs 24-1 to 24-y have similar configurations, therefore, the PLC 24-1 will be described as an example in the following.

Figure 3:
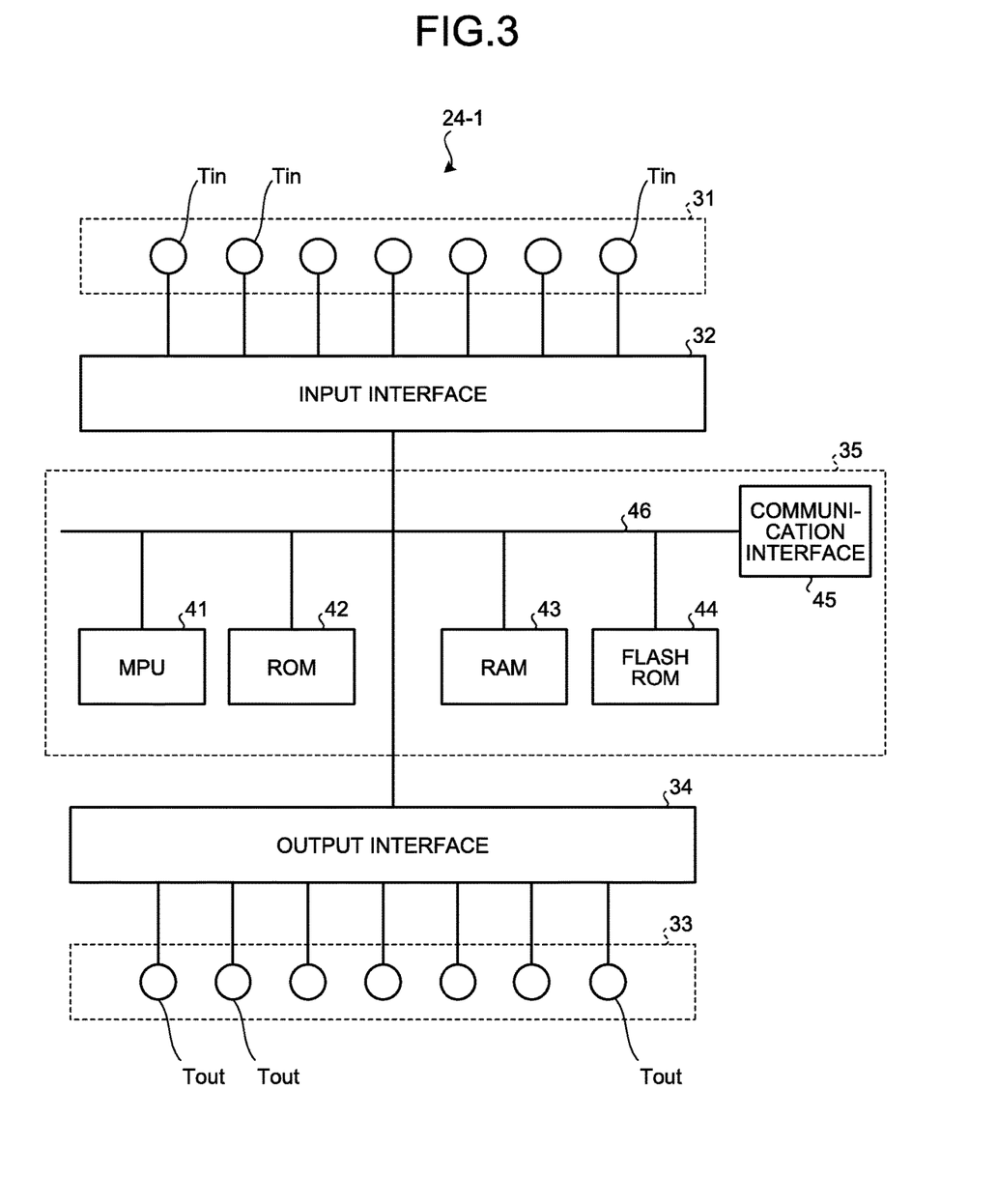
FIG. 3 is a schematic configuration block diagram of a PLC.

FIG. 3 is a schematic configuration block diagram of the PLC.

The PLC 24-1 includes an input terminal unit 31, an input interface 32, an output terminal unit 33, an output interface 34, and a control unit 35. The input terminal unit 31 includes input terminals to which various input devices such as a switch, a sensor, and a signal generator are connected. The input interface 32 is connected to the input terminal unit 31 to work as an input interface. The output terminal unit 33 includes multiple output terminals to which various output devices (controlled devices) such as a valve, a lamp, a buzzer, and an actuator are connected. The output interface 34 is connected to the output terminal unit 33 to work as an output interface. The control unit 35 is connected to the input interface 32 and the output interface 34 to control the entire PLC 24-1.

In the aforementioned configuration, the control unit 35 is configured as a micro computer and includes an MPU 41 that controls the entire control unit 35, a ROM 42 that stores various types of data including a control program in a non-volatile manner, a RAM 43 used as a work area that temporarily stores various types of data, a flash ROM 44 that stores various types of data such as a control parameter in a non-volatile and updatable manner, a communication interface 45 for communicating with the other PLCs or a server via the communication network, and a bus 46 that communicably connects the respective elements.

Next, a functional configuration of the local control system 13-1 will be described.

Figure 4:
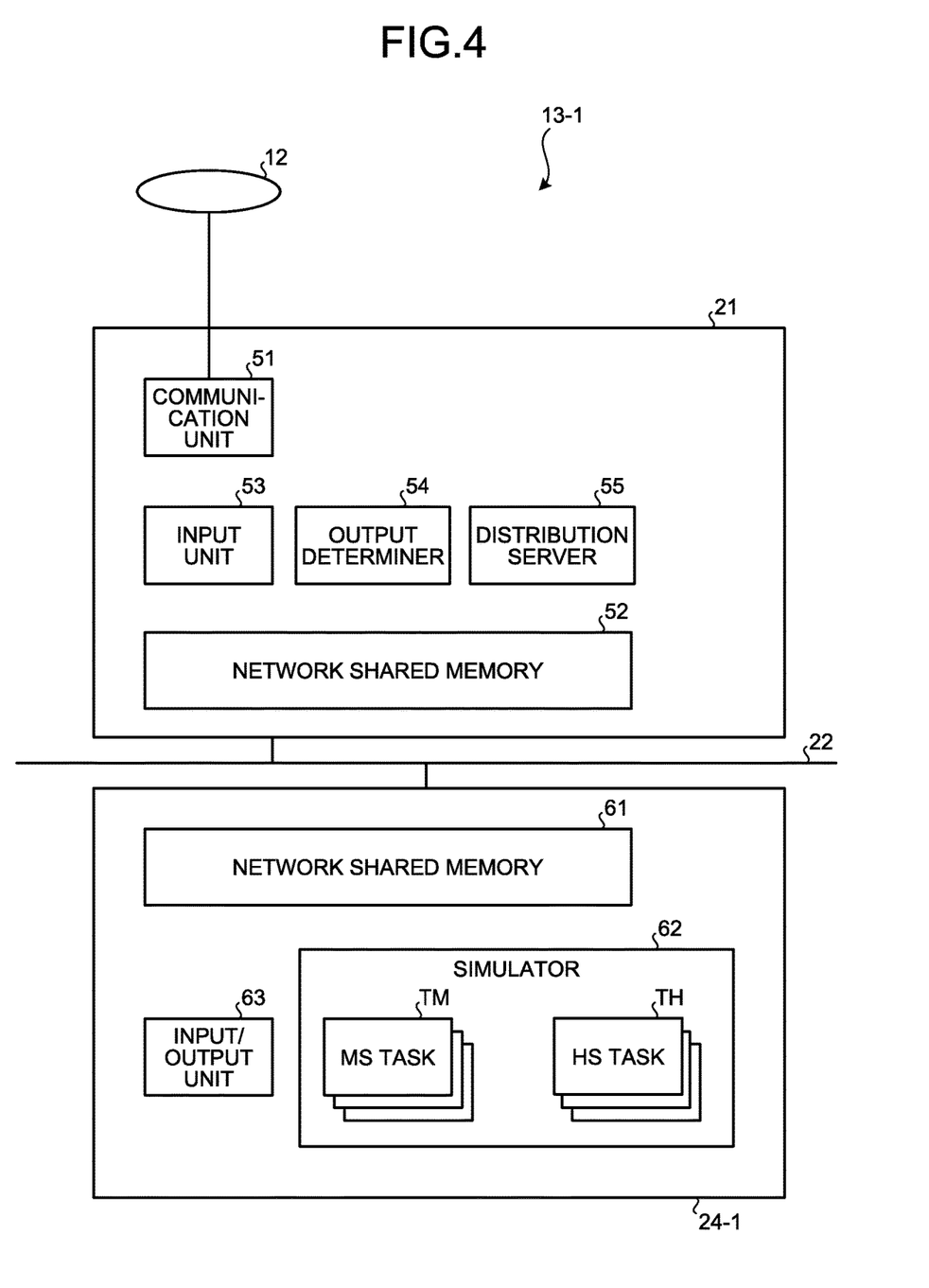
FIG. 4 is a schematic functional block diagram of the local control system.

FIG. 4 is a schematic functional block diagram of the local control system.

The communication module 21 of the local control system 13-1 includes a communication unit 51 that performs communication (packet communication) with the server system 11, a network shared memory 52 that stores therein data to be shared with the PLCs 24-1 to 24-y connected via the LAN 22, and an input unit 53 that inputs input information placed in the network shared memory 52 to the communication unit 51.

The communication module 21 also includes an output determiner 54 that compares a result of calculation by the server system 11 received via the communication unit 51 and a result of calculation by the local control system 13-1 stored in the network shared memory 52 to select one of the calculation results on the basis of a result of the comparison and then stores the selected calculation result in a certain calculation result storage area.

The communication module 21 further includes a distribution server 55 that determines to which one of the PLCs 24-1 to 24-y connected via the LAN 22 a program organization unit (POU) is allocated. The POU is created by modularizing each function of a program for executing the entire processing of the local control system 13-1.

In the embodiment the program organization unit is not necessarily created for the PLC 24-1 to the PLC 24-y to execute their individual operations. That is, it only assumes part of a function to be implemented in the local control system 13-1. For example, the result of the program organization unit POU executed by the PLC 24-1 may not be used by the PLC 24-1 but by the PLC 24-3. In view of this, the distribution server 55 allocates program organization units POU to the PLCs so as to enhance execution efficiency of the entire local control system 13-1. Details of the allocation will be described later.

In the above configuration, the communication module 21 communicates with the server system 11 and acquires a task to be executed by the local control system 13-1 (a main scan task TM or a high-speed scan task TH described later) every time the task is changed or updated, to distribute the task to the PLCs 24-1 to 24-y connected via the LAN 22.

Meanwhile, each of the PLC 24-1 to PLC 24-y includes a network shared memory 61, a simulator 62, and an input/output unit 63. The network shared memory 61 stores data therein to be shared with the other PLCs and the communication module 21 connected via the LAN 22. The simulator 62 executes, at timing at which a scan period starts, the program organization unit POU corresponding to a main scan task (MS task) TM or a high-speed scan task (HS task) TH which are allocated by the distribution server 55, to write (store) a result of the calculation to a certain region of the network shared memory 61 as a local calculation result as well as to write an execution flag indicating completion of the calculation to a certain region of the network shared memory 61. The main scan task TM is to be executed with a lower priority and has a longer maximum allowable execution time and the high-speed scan task TH is to be executed with a higher priority and has a shorter maximum allowable execution time. The input/output unit 63 outputs, as output information, a calculation result to a corresponding output device at timing at which the scan period ends.

Now, the allocation of the program organization units POU to the PLC 24-1 to PLC 24-y will be described.

Typically, processors such as an MPU and a DSU have strengths and weaknesses in terms of calculations (e.g., radix calculation, complementary calculation, floating-point calculation, and shift calculation), and differ in usable resources (e.g., a memory and a cache) depending on hardware configuration.

That is, the MPUs 41 serving as processors of the PLC 24-1 to PLC 24-y similarly have strengths and weaknesses in the calculations (e.g., radix calculation, complementary calculation, floating-point calculation, and shift calculation). Even the same processor differs in calculation speed due to the frequency of an interruption (number of controlled devices), for example.

Because of this, the processors and the PLCs execute the same program organization unit POU at individually different calculation speeds.

In view of this, in the first embodiment, one of the PLCs of each of the local control systems 13-1 to 13-n includes a simulator commander that instructs the PLCs of each local control system to perform an operation simulation, collect information for allocating the program organization units in advance, and create an allocation reference.

Specifically, in the following it is assumed that the PLC 24-3 includes the simulator commander.

Figure 5:
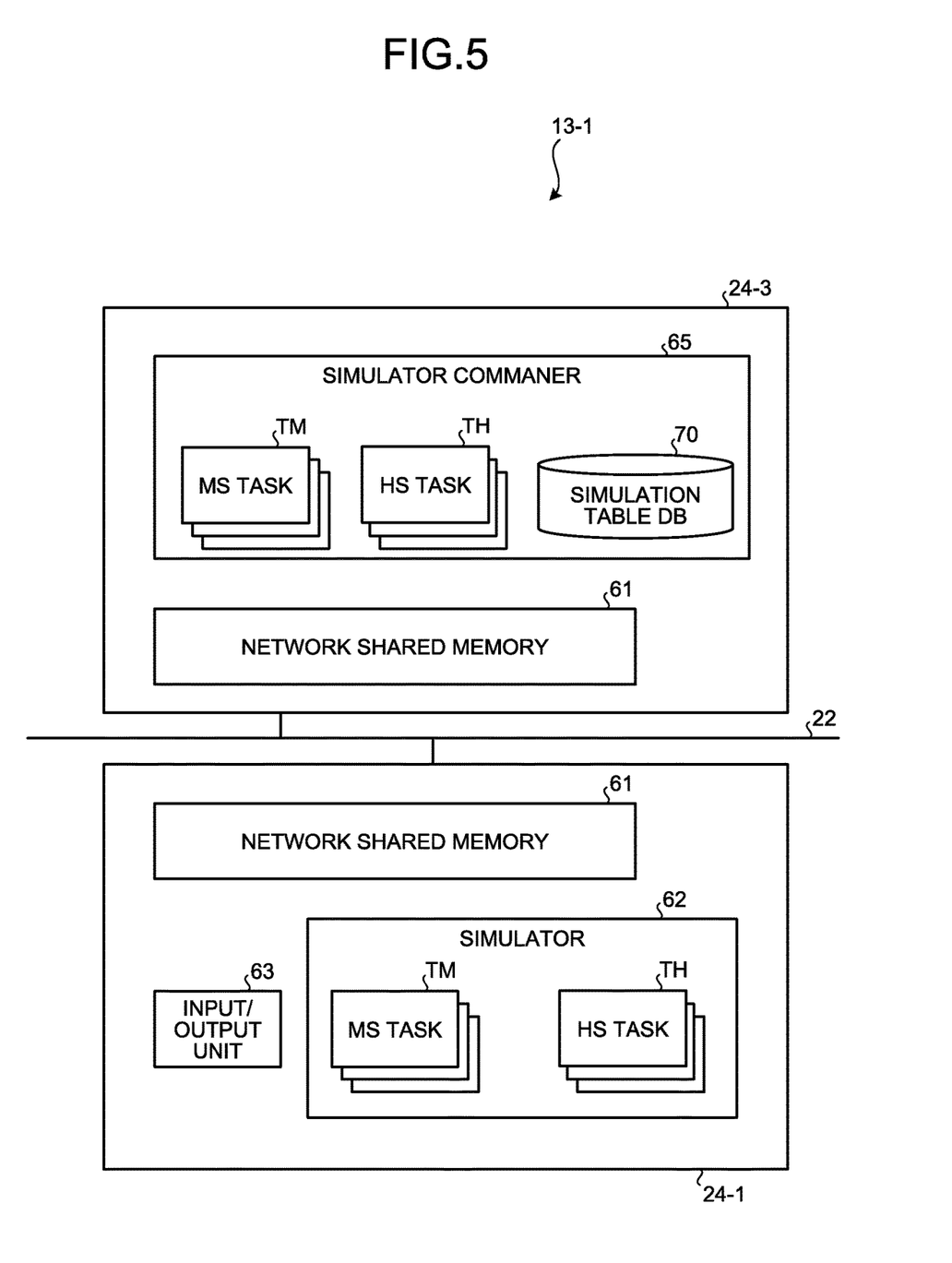
FIG. 5 is a functional configuration block diagram of the PLC including a simulator commander.

FIG. 5 is a block diagram illustrating a functional configuration of the PLC including the simulator commander.

The PLC 24-3 provided with a simulator commander 65 communicates with the communication modules 21 (or the PLCs (nodes) of the other local control systems 13-2 to 13-n) to acquire a task every time the task is changed or updated. The simulator commander 65 sets, at a certain address of the network shared memory 61, a simulation flag indicating that the simulator commander 65 is performing not actual control but a simulation.

The contents of the network shared memory 61 are reflected in the network shared memory 52 of the communication module 21 in the local control system 13-1 as well.

As a result, when the simulation flag is set at a certain address of the network shared memory 52, the distribution server 55 of the communication module 21 in the local control system 13-1 (refer to FIG. 4) temporarily stops the allocation of the program organization units POU. Following this, the simulator commander 65 of the PLC 24-3 transmits allocation information to the distribution server 55 via, for example, the network shared memory 52 in response to an instruction from an operator to allocate the program organization unit in question to a certain PLC. Thereby, the distribution server 55 can allocate an intended program organization unit to the certain PLC in accordance with the operator's simulation instruction.

Figure 6:
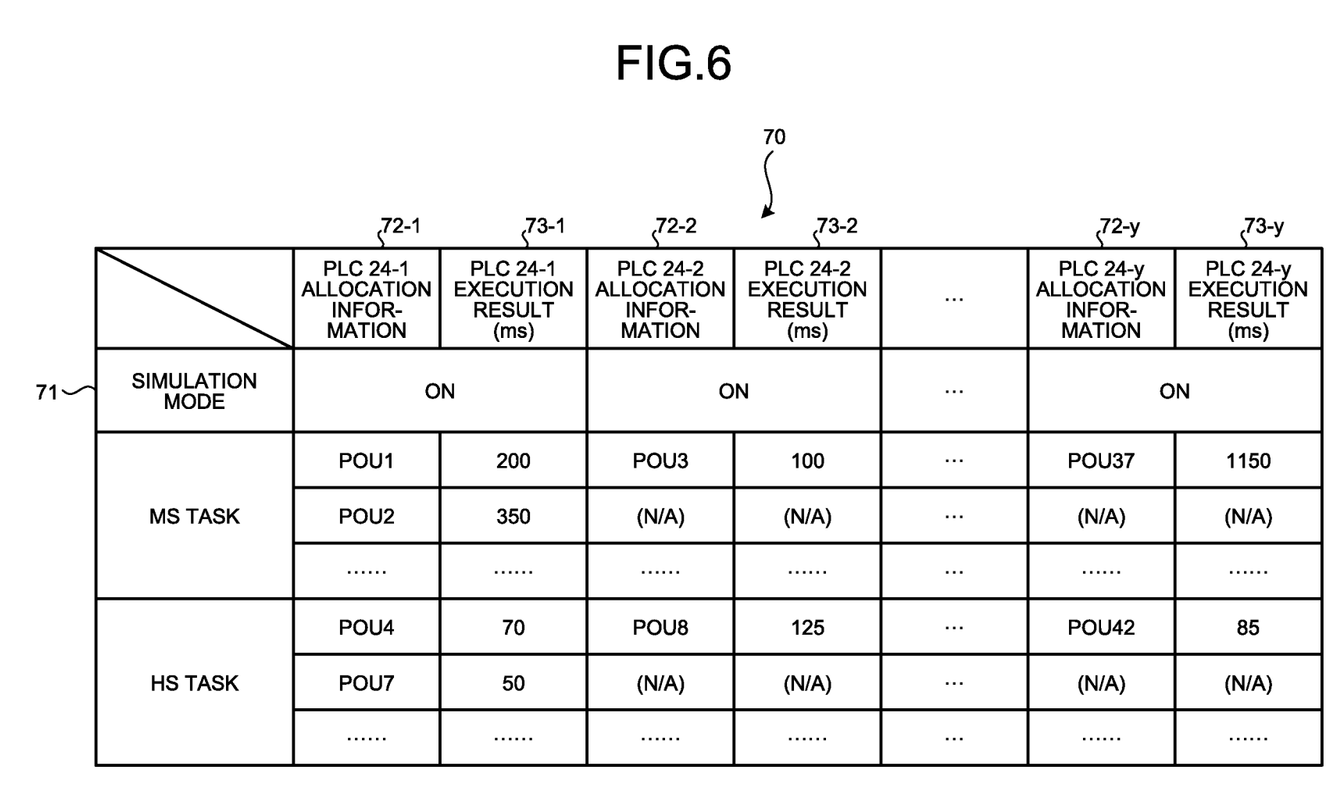
FIG. 6 is an explanatory diagram of a simulation table database.

FIG. 6 is an explanatory diagram of a simulation table database.

In the embodiment, the simulator commander 65 holds the instructions of the operator in advance as a simulation table database (DB) 70 in reality.

Specifically, the simulator commander 65 overwrites the allocation information in order to allocate the certain program organization units POU to the respective PLCs 24-1 to 24-y of the local control system 13-1 on the basis of the simulation table database (simulation list) 70 designed by a user.

Consequently, the simulator 62 of each of the PLCs 24-1 to 24-y of the local control system 13-1 starts, at the scan-period start timing, calculations in the allocated program organization unit on the basis of the allocation information and then records a result of the calculations in the network shared memory 61 as a local execution result (calculation result).

The input/output unit 63 of each of the PLCs 24-1 to 24-y of the local control system 13-1 does not output the calculation result to the output device as the output information at the scan-period end timing when the simulation flag is set at the certain address of the network shared memory 61. This is because the calculation result of the allocated program organization unit POU is a simulation. Thus, a simulation result is prevented from being used in the control.

Thereby, the PLC 24-3 also functioning as the simulator commander 65 monitors the network shared memory 61 to which the calculation result is output and stores a length of time taken for executing the calculation in question (calculation time) in the simulation table database 70 as a simulation result.

As illustrated in FIG. 6, the simulation table database 70 includes, for each of the PLCs 24-1 to 24-y, simulation-mode data 71 containing simulation flags, allocation information data 72-1 to 72-y for designating the allocation of tasks to be simulated depending on priorities of the tasks, and execution-result data 73-1 to 73-y containing calculation time (simulation time) for each task.

For example, in the example in FIG. 6, the PLC 24-1 has a program organization unit POU1 and a program organization unit POU2 allocated thereto, as indicated in the allocation information data 72-1, the program organization units POU1 and POU2 serving as the main scan tasks TM having lower priorities and longer maximum allowable execution times (e.g., 1000 ms). Their execution-result data 73-1 indicates 200 ms and 350 ms, respectively.

In addition, the PLC 24-1 has a program organization unit POU4 and a program organization unit POU7 allocated thereto as indicated in the allocation information data 72-1, the program organization units POU4 and POU7 serving as the high-speed scan tasks TH having higher priorities and shorter maximum allowable execution times (e.g., 100 ms). Their execution-result data 73-1 indicates 70 ms and 50 ms, respectively.

Likewise, the PLC 24-2 has a program organization unit POU3 serving as the main scan task TM allocated thereto as indicated in the allocation information data 72-2. The execution-result data 73-2 thereof indicates 100 ms.

The PLC 24-2 also has a program organization unit POU8 serving as the high-speed scan task TH allocated thereto as indicated in the allocation information data 72-2. The execution-result thereof is 125 ms as indicated in the execution result data 73-2.

The PLC 24-y has a program organization unit POU37 serving as the main scan task allocated thereto as indicated in the allocation information data 72-y. The execution-result data thereof indicates 1,150 ms.

The PLC 24-y also has a program organization unit POU42 serving as the high-speed scan task allocated thereto as indicated in the allocation information data 72-y. The execution result thereof is 85 ms as indicated in the execution-result data 73-y.

Thus, to allocate the program organization units on the basis of the simulation results in the example above, it is determined for the PLC 24-1 that the program organization unit POU1 and the program organization unit POU2 serving as the main scan tasks can be allocated to the PLC 24-1 because the execution times for the program organization unit POU1 and the program organization unit POU2 fall within the maximum allowable execution time for the main scan task (e.g., 1000 ms).

Likewise, it is determined that the program organization unit POU4 serving as the high-speed scan task can be allocated to the PLC 24-1 because the execution time for the program organization unit POU4 falls within the maximum allowable execution time for the high-speed scan task (e.g., 100 ms).

As for the PLC 24-2, it is determined that the program organization unit POU3 serving as the main scan task can be allocated to the PLC 24-2 because the execution time of the program organization unit POU3 falls within the maximum allowable execution time of the main scan task (e.g., 1000 ms).

However, it is determined that the program organization unit POU8 serving as the high-speed scan task TH cannot be allocated to the PLC 24-2 because the execution time of the functional unit program POU8 is 125 ms over the maximum allowable execution time of the high-speed scan task (e.g., 100 ms).

Likewise, as for the PLC 24-y, the execution time of the program organization unit POU37 is 1150 over the maximum allowable execution time of the main scan task (e.g., 1000 ms), therefore, it is determined that the program organization unit POU37 serving as the main scan task cannot be allocated to the PLC 24-y.

In addition, it is determined that the program organization unit POU42 serving as the high-speed scan task TH can be allocated to the PLC 24y because the execution time of the program organization unit POU42 falls within the maximum allowable execution time of the high-speed scan task TH (e.g., 100 ms).

As described thus far, it is made possible to properly understand a calculation characteristic of each of the PLC 24-1 to the PLC 24-y of the local control system and to distribute loads thereto. It is also possible to use the simulation result as an indicator for deciding the number of the PLCs (the number of nodes) for a local side. Specifically, when the number of the program organization units to be allocated to the PLCs is determined to be too large, the number of the PLCs can be increased to an optimum number (=y).

Meanwhile, actual system designing needs to assume occurrence of a failure in the PLC.

For example, failures in the PLC 24-1 to the PLC 24-y can be assumed to arise from failures in the input/output units 63 and the simulator units 62.

In order to detect a failure in the input/output units 63 and the simulators 62, it is necessary to monitor an area (address), of the network shared memory 52, from or to which the input/output units 63 or the simulators 62 periodically outputs or inputs data.

For example, the distribution server 55 monitors the area (address) to or from which the input/output unit 63 or the simulator 62 inputs or outputs data periodically.

More specifically, in the case of finding no periodic inputs or outputs to the area (address) from the simulator 62 while monitoring the area, the distribution server 55 determines the simulator 62 concerned as having a failure and distributes (allocates) program organization units to the PLCs (nodes) except for that including the simulator 62 concerned.

Alternatively, an alternative PLC (alternative node) that can substitute for the PLC (node) having a failure may be explicitly set in advance. For example, the simulation table database 70 may contain alternative PLC specifying data for specifying the alternative PLC (alternative node).

Figure 7:
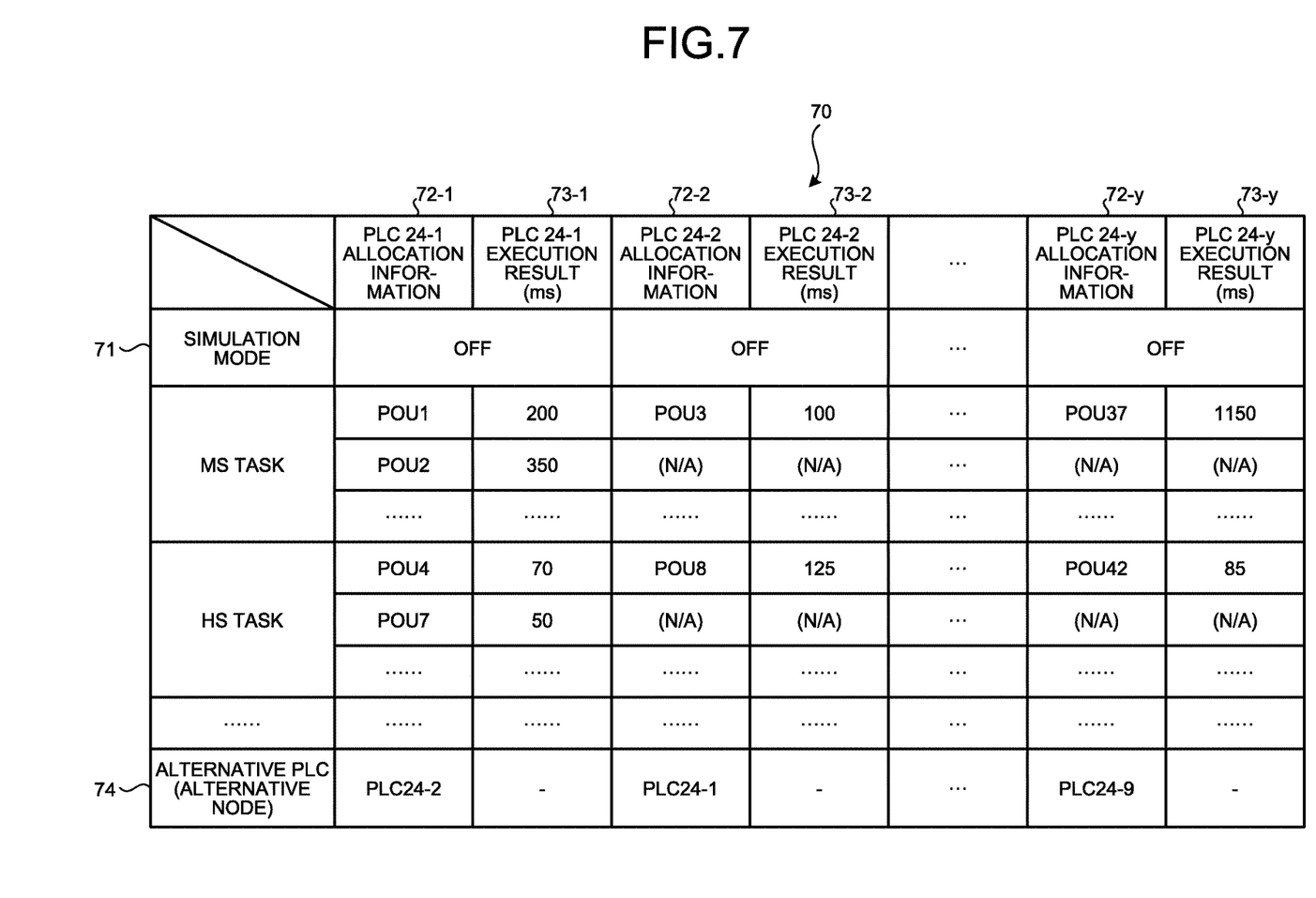
FIG. 7 is an explanatory diagram of another simulation table database.

FIG. 7 is an explanatory diagram of another simulation table database.

As illustrated in FIG. 7, with alternative PLC specifying data 74 provided, the PLC 24-1 can function as an alternative PLC for the one having a failure, for example, the PLC 24-2.

Meanwhile, in the case of occurrence of a failure in the input/output unit 63, the execution of the program organization unit POU referring to the inputs cannot produce an execution result, which is meaningless. In view of this, the distribution server 55 can be configured so as to distribute other program organization units than the program organization unit concerned. In a case where the alternative PLC is explicitly specified for the PLC having the input/output unit 63 with a failure, the distribution server 55 can operate, ignoring the PLC with a failure.

According to such a configuration, it is made possible to properly recognize a failure in each of the PLCs (nodes) of the local control system when it occurs, and properly distribute loads to the PLCs.

[2] Second Embodiment

The above embodiment has described a configuration in which the program organization units are allocated to the PLCs of the local control system for distributed processing on the basis of a control instruction from the server system 11. According to the present embodiment, the server system 11 also runs the same program organization units POU as those allocated to the PLCs of each of the local control systems 13-1 to 13-n. When resultants thereof match with each other, the PLCs are determined to normally operate. On the other hand, when the resultants do not match with each other (differ from each other), the determination made by the local control systems 13-1 to 13-n is adopted with priority.

Figure 8:
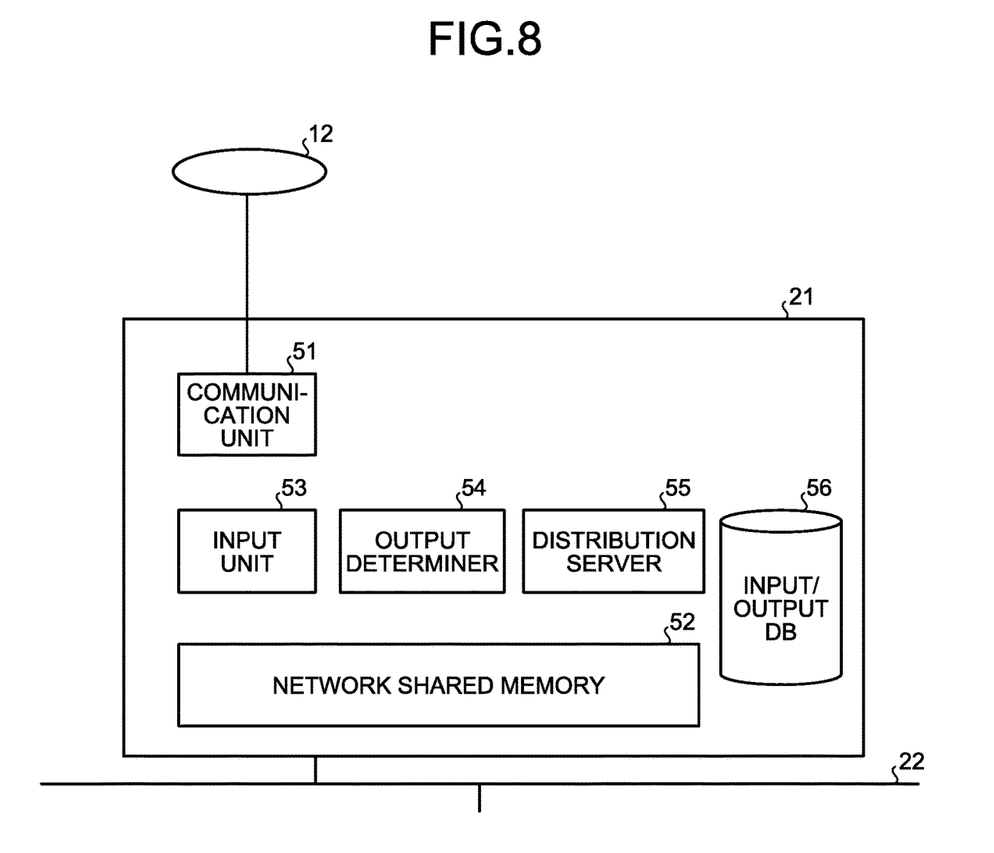
FIG. 8 is a schematic functional configuration diagram of a communication module according to a second embodiment.

FIG. 8 is a schematic functional configuration diagram of a communication module according to a second embodiment.

Input information to an input unit 53 of a communication module 21 corresponds to output information to an output determiner 54 from the local control systems 13-1 to 13-n one by one with respect to the same program organization unit POU in the same scan period.

In view of this, the second embodiment includes an input/output database 56 that records and stores information on data input and data output, to compare execution results of the program organization units POU executed by both of the server system 11 and the local control systems 13-1 to 13-n for operation control.

Figure 9:
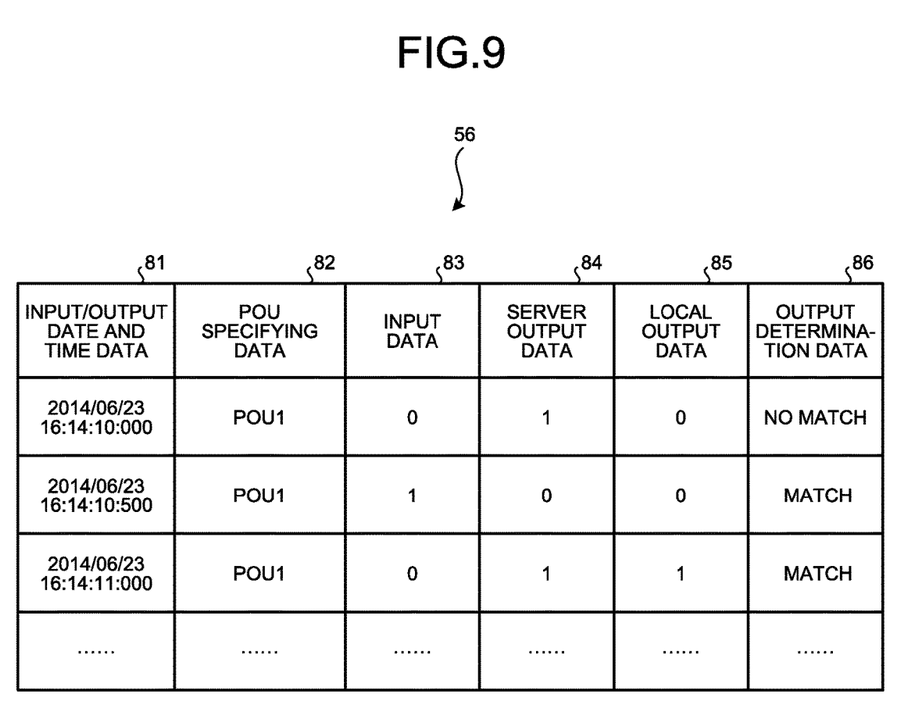
FIG. 9 is an explanatory diagram of an exemplary input/output database.

FIG. 9 is an explanatory diagram of an exemplary input/output database.

The input/output database 56 includes input/output date and time data 81 containing dates and time of inputs and outputs, program organization unit specifying data 82 for specifying the program organization units POU, input data 83, server output data 84 representing execution results by the server system 11, local output data 85 representing execution results by the PLCs, and output determination data 86 containing results of output determination.

Executions of the same program organization unit POU by the server system 11 and the PLCs 24-1 to 24-y of the local control systems 13-1 to 13-n are supposed to produce the same result as long as the value of the input data 83 is unchanged.

This means that as for the same program organization unit POU, a difference in output data relative to the same input data 83 between the server system 11 and the corresponding PLC can be determined as occurrence of some kind of anomaly.

For example, in the example in FIG. 9, the input/output date and time data="2014/06/23 16:14:10:000", the program organization unit specifying data="POU1", the server output data 84="1" (in the scan period of 500 ms), and the local output data 85="0". Thus, a difference between the server output data 84 and the local output data 85 is found by comparison.

As described above, a difference in the output data between the server system 11 and the local control systems 13-1 to 13-n is suspected to be due to a human induced factor except for a failure in a device.

Hence, the second embodiment stores the results of calculation by the server system 11 and the local control systems 13-1 to 13-n and utilizes them for troubleshooting in the case of occurrence of a difference therebetween. For example, if a malicious person spoofs a calculation result by the server system on a route, the person's attempt for attacking a system or a plant, what part (where) thereof and when to attack, can be identified.

Furthermore, when a difference is suspected to be due to artificial data manipulation, it is expected that operators are required to act quickly based on code of conduct defined in each factory and each plant. Thus, the difference needs to be promptly sent to the operators.

In such a situation, the input/output database 56 can be regularly monitored for output determination, and when a difference is found in the output determination, a notification (communication) thereof is sent to a pre-designated device (a PC of HMI or an alarm light) via the communication network (e.g., LAN).

Then, the device receiving the notification may issue a preset alarm (beep sound) or output text information to a display.

In other words, any means can be used for the notification as long as the information can be sent to the operator to be notified in proper expression.

As a result, it is made possible to quickly convey the detection of a difference in the output data due to a human action to the operator, which allows the operator to quickly deal with the situation. This also functions as a business continuity plan (BCP) for ensuring operational continuity of the distributed control system.

As described thus far, according to the respective embodiments, operations can be optimally allocated to the control devices which work in coordination with one another, whereby the reliability of the entire control system can be improved.

In the description thus far, the server system 11 has been explained as a single device. However, the server system 11 can be also applied to a cloud server system where multiple server devices are arranged at different locations in the communication network such as the Internet.

The program executed by the control devices according to the embodiments is recorded and provided in an installable or executable file format on a recording medium readable by a computer, such as a CD-ROM, a flexible disk (FD), a CD-R, and a digital versatile disk (DVD).

The program executed by the control devices according to the embodiments may be stored in a computer connected to a network such as the Internet and provided by way of download via the network. Furthermore, the program executed by the control devices according to the embodiments may be provided or distributed via a network such as the Internet.

In addition, the program executed by the control devices according to the embodiments may be incorporated into a ROM or the like in advance and provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A distributed control system comprising:
  a plurality of local control systems,
  the local control systems each comprising:
    a first communication network;
    a plurality of control devices connected to each other via the first communication network, configured to control devices to be controlled, respectively, and
    a communication module connected to the control devices via the first communication network and connected to a server system via a second communication network, wherein
  the control devices each include:
    a simulator to which a program organization unit is allocated in advance, configured to simulate the allocated program organization unit, the program organization unit constituting part of a control program executed in the distributed control system, and
    a shared memory that stores an execution result of the program organization unit executed by the simulator to be shared with another control device,
  at least one of the control devices include:
    a simulation table database that stores therein an execution time of each of the program organization units allocated in advance to the control devices, and stores information on an alternative control device for one of the control devices in case of occurrence of a failure, and
    a simulation commander that stores, in the simulation table database, the execution time of each of the program organization units corresponding to the execution result, referring to the shared memory, and
  the communication module includes:
    an output determiner that sets same input data for the allocated program organization unit to determine whether the execution result of each of the program organization units found in the server system matches the execution result of each of the program organization units found by the control devices, and
    an input and output database that stores the execution result of each of the program organization units found in the server system, the execution result of each of the program organization units found by the control devices, and a result of the determination in association with one another.

2. The distributed control system according to claim 1, wherein
  the output determiner compares, for the determination, an execution result by the control device of the local control system including the output determiner or an execution result by the control device of another local control system with the execution result by the server system in unit of the program organization units at a timing at which a scan period ends, and
  the communication module includes a notifier that notifies no match when a comparison result indicates no match by a determination by the output determiner.

3. A control device to be connected with another control device via a communication network to construct a distributed control system, configured to control a device to be controlled in cooperation with the another control device, the control device comprising:
  a simulator to which a program organization unit is allocated in advance, configured to simulate the allocated program organization unit, the program organization unit constituting part of a control program executed in the distributed control system;
  a shared memory that stores a simulation result of the program organization unit simulated by the simulator to be shared with another control device;
  a simulation table database that stores therein an execution time of each of the program organization units allocated in advance to the control devices, and stores information on an alternative control device for one of the control devices in case of occurrence of a failure; and
  a simulation commander that stores, in the simulation table database, the execution time of each of the program organization units corresponding to the simulation result, referring to the shared memory.

4. The control device according to claim 3, comprising:
  an executor to which the program organization unit is allocated in advance, configured to execute the allocated program organization unit, wherein
  the shared memory stores an execution result of the program organization unit executed by the executor and an execution result by the executor of the another control device; and
  the control device controls the device to be controlled based on the execution result by the executor or the execution result acquired by referring to the shared memory.

5. A control method to be carried out by a control device connected via a communication network to another control device to construct a distributed control system, the control device comprising a shared memory that stores data to be shared with another control device, and a simulation table database that stores therein an execution time of each of the program organization units allocated in advance to the control devices, the control device that controls a device to be controlled in cooperation with the another control device, the control method comprising:
- simulating an allocated program organization unit, the allocated program organization unit constituting part of a control program executed in the distributed control system;
- storing a result of the simulation of the program organization unit in the shared memory to be shared with the another control device; and
- storing, in the simulation table database, an execution time of each of the program organization units corresponding to the simulation result, referring to the shared memory.

6. The control method according to claim 5, comprising:
executing the allocated program organization unit;
storing an execution result of the executed program organization unit and an execution result by the another control device in the shared memory; and
controlling the device to be controlled based on the execution result by the control device or the execution result by the another control device acquired by referring to the shared memory.

7. A computer program product including programmed instructions embodied in and stored on a non-transitory computer readable medium, wherein the instructions, when executed by a computer to control a control device connected via a communication network to another control device to construct a distributed control system, the control device comprising a shared memory that stores data to be shared with another control device, and a simulation table database that stores therein an execution time of each of the program organization units allocated in advance to the control devices, the control device that controls a device to be controlled in cooperation with the another control device, cause the computer to perform:
- simulating an allocated program organization unit, the allocated program organization unit constituting part of a control program executed in the distributed control system;
- storing a result of the simulation of the program organization unit in the shared memory to be shared with the another control device; and
- storing, in the simulation table database, an execution time of each of the program organization units corresponding to the simulation result, referring to the shared memory.

8. The computer program product according to claim 7, causing the computer to perform:
executing the allocated program organization unit;
storing an execution result of the executed program organization unit and an execution result by the another control device in the shared memory; and
controlling the device to be controlled based on the execution result by the control device or the execution result by the another control device acquired by referring to the shared memory.

* * * * *